United States Patent
Thiesson et al.

(10) Patent No.: US 7,778,837 B2
(45) Date of Patent: Aug. 17, 2010

(54) DEMOGRAPHIC BASED CLASSIFICATION FOR LOCAL WORD WHEELING/WEB SEARCH

(75) Inventors: Bo Thiesson, Woodinville, WA (US); Kenneth W. Church, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 843 days.

(21) Appl. No.: 11/565,231

(22) Filed: Nov. 30, 2006

(65) Prior Publication Data

US 2007/0255552 A1    Nov. 1, 2007

Related U.S. Application Data

(60) Provisional application No. 60/746,134, filed on May 1, 2006.

(51) Int. Cl.
*G10L 21/00* (2006.01)
(52) U.S. Cl. .............................. 704/278; 704/7; 704/9; 704/246; 704/251
(58) Field of Classification Search .................. None
See application file for complete search history.

(56) References Cited

U.S. PATENT DOCUMENTS

| | | | |
|---|---|---|---|
| 5,386,556 A | | 1/1995 | Hedin et al. |
| 5,485,372 A | | 1/1996 | Golding et al. |
| 5,787,422 A | * | 7/1998 | Tukey et al. .................. 707/5 |
| 5,963,671 A | | 10/1999 | Comerford et al. |
| 6,573,844 B1 | | 6/2003 | Venolia et al. |
| 6,654,733 B1 | | 11/2003 | Goodman et al. |
| 6,687,734 B1 | | 2/2004 | Sellink et al. |
| 6,785,677 B1 | | 8/2004 | Fritchman |
| 6,801,190 B1 | | 10/2004 | Robinson |
| 7,539,656 B2 | * | 5/2009 | Fratkina et al. ............... 706/45 |
| 2002/0156779 A1 | * | 10/2002 | Elliott et al. ................... 707/6 |

(Continued)

FOREIGN PATENT DOCUMENTS

| | | |
|---|---|---|
| EP | 0924594 | 6/1999 |
| WO | 0182119 | 1/2001 |

OTHER PUBLICATIONS

International Search Report dated Sep. 28, 2007 for PCT Application Serial No. PCT/US2007/008570, 7 Pages.

(Continued)

*Primary Examiner*—Richemond Dorvil
*Assistant Examiner*—Leonard Saint Cyr
(74) *Attorney, Agent, or Firm*—Lee & Hayes, PLLC (57) ABSTRACT

Systems and methods that create a classification of sentences in a language, and further construct associated local versions of language models, based on geographical location and/or other demographic criteria—wherein such local language models can be of different levels of granularity according to chosen demographic criteria. The subject innovation employs a classification encoder component that forms a classification (e.g. a tree structure) of sentences, and a local language models encoder component, which employs the classification of sentences in order to construct the localized language models. A decoder component can subsequently enable local word wheeling and/or local web search by blending k-best answers from local language models of varying demographic granularity that match users demographics. Hence, k-best matches for input data by users in one demographic locality can be different from k-best matches for the same input by other users in another locality.

16 Claims, 10 Drawing Sheets

U.S. PATENT DOCUMENTS

| | | | |
|---|---|---|---|
| 2003/0061027 A1 | 3/2003 | Weise et al. | |
| 2003/0212702 A1* | 11/2003 | Campos et al. | 707/102 |
| 2004/0201607 A1 | 10/2004 | Mulvey et al. | |
| 2004/0260534 A1 | 12/2004 | Pak et al. | |
| 2006/0085392 A1 | 4/2006 | Wang et al. | |
| 2007/0147269 A1* | 6/2007 | Ettle et al. | 370/254 |

OTHER PUBLICATIONS

Lee Wang, et al. Detecting dominant locations from search queries, SIGIR '05, Aug. 15-19, 2005, Salvador, Brazil.

Junyan Ding, et al. Computing geographical scopes of web resources, Proceedings of the 26th VLDB Conference, Cairo, Egypt, 2000.

J. L. Bentley. Multidimensional binary search trees used for associative searching, Commun. ACM, 18:9, pp. 509-517, 1975.

S.T. Dumais, et al. Stuff I've Seen: A system for personal information retrieval and re-use, SIGIR, 2003.

M. D. McIlroy. Development of a spelling list, IEEE Trans. on Communications 30, pp. 91-99, 1982.

M. Mohri, et al. Weighted Finite-State Transducers in Speech Recognition. Computer Speech and Language, 16(1), pp. 69-88, 2002.

Using the Word Wheel, Technical Tips, http://www.isys-search.com/support/techtips/wordwheel.html, last accessed Jun. 23, 2005.

MSN Desktop Search (beta), http://www.pcmag.com/article2/0,1759,1771841,00.asp, last accessed Jun. 23, 2005.

F. Jelinek. Statistical Methods for Speech Recognition. pp. 60-67, 1997.

I. H. Witten, et al. Managing Gigabytes: Compressing and Indexing Documents and Images, by Morgan Kaufmann Publishing, San Francisco, 1999, pt. 1, 65 pages, (front cover-36).

I. H. Witten, et al. Managing Gigabytes: Compressing and Indexing Documents and Images, by Morgan Kaufmann Publishing, San Francisco, 1999, pt. 2, 65 pages, (37-101).

I. H. Witten, al. et al. Managing Gigabytes: Compressing and Indexing Documents and Images, by Morgan Kaufmann Publishing, San Francisco, 1999, pt. 3, 65 pages, (102-166).

I. H. Witten, et al Managing Gigabytes: Compressing and Indexing Documents and Images, by Morgan Kaufmann Publishing, San Francisco, 1999, pt. 4, 55 pages, (167-221).

I. H. Witten, al. et al Managing Gigabytes: Compressing and Indexing Documents and Images, by Morgan Kaufmann Publishing, San Francisco, 1999, pt. 5, 48 pages, (222-270).

I. H. Witten, et al. Managing Gigabytes: Compressing and Indexing Documents and Images, by Morgan Kaufmann Publishing, San Francisco, 1999, pt. 6, 58 pages, (271-328).

I. H. Witten, et al. Managing Gigabytes: Compressing and Indexing Documents and Images, by Morgan Kaufmann Publishing, San Francisco, 1999, pt. 7, 60 pages, (329-388).

I. H. Witten, et al. Managing Gigabytes: Compressing and Indexing Documents and Images, by Morgan Kaufmann Publishing, San Francisco, 1999, pt. 8, 65 pages, (389-452).

I. H. Witten, et al. Managing Gigabytes: Compressing and Indexing Documents and Images, by Morgan Kaufmann Publishing, San Francisco, 1999, pt. 9, 67 pages, (453-back cover).

* cited by examiner

DEMOGRAPHIC BASED CLASSIFICATION FOR LOCAL WORD WHEELING/WEB SEARCH

CROSS-REFERENCE TO RELATED APPLICATIONS

This application claims the benefit of U.S. Provisional Application No. 60/746,134 filed on May 1, 2006 entitled "DEMOGRAPHIC BASED TREE FOR LOCAL WORD WHEELING/WEB SEARCH". In addition, this application is related to co-pending U.S. patent application Ser. No. 11/333,486, filed on Jan. 17, 2006 entitled, "SERVER SIDE SEARCH WITH MULTI-WORD WORD WHEELING AND WILDCARD EXPANSION", and co-pending U.S. patent application Ser. No. 11/332,954, filed Jan. 17, 2006 entitled, "MULTI-WORD WORD WHEELING", the entireties of these applications are hereby incorporated by reference.

BACKGROUND

Technological advances in computer hardware, software and networking have provided efficient, cost effective computing systems that can communicate with each other from practically anywhere in the world. Such systems are employed to access, browse and search the Internet, compose, send and receive email messages, view and edit documents, transmit and obtain text messages, instant messages, and the like. For example, a user can employ cellular telephones, personal digital assistants (PDA), to search the Internet for movie times, invite a friend to a particular showing by sending an email, text message, or instant message.

Various techniques have been employed to input information in such devices, such as inputting data by using keyboard, mouse, touch sensitive screen, pen device, optical character recognition, speech recognition, and the like. For example, conventional systems often employ keyboards that can vary in size depending upon type of the host device—whether a personal computer or laptop or the like—such devices can employ a keyboard based on a QWERTY layout, wherein each alphanumeric character can be associated with a respective key, while a cellular telephone can include fewer keys such that a number of alphabetic characters share a single key with a numeric character. For instance, a "2" key on a cellular telephone keypad is commonly associated with the letters "A", "B", and "C".

Moreover, pluralities of techniques are commonly employed to input text with a limited keyboard—yet ambiguities appear when more than one alphanumeric character is associated with a particular key. For instance, a multiple-tap approach can be implemented, wherein a user presses a numeric key a number of times to enter a desired letter or number. Accordingly, the "2" key can be pressed once, to input the number 2, twice to input the letter A, three times to input the letter B, and four times to input the letter C. A pause and/or pressing a key that moves a cursor (e.g. an arrow key) can help differentiate between distinct alphanumeric characters. Such technique, however, is commonly time consuming and inefficient for users—since a single key may be pressed a number of times to enter a single alphanumeric character. Another common approach to enter text with numeric keys is a single-tap approach, where users press the numeric key associated with a desired letter once. Thereafter, inputted characters are disambiguated, by matching a sequence of characters corresponding with a word to a sequence stored in memory, for example. Hence, to enter the word "cell" a user can press the sequence 2-3-5-5, which can be compared to stored sequences in memory. Even though the single-tap approach offers a more efficient manner in which to enter text, it has drawbacks.

Typically, conventional web search and multi-word wheeling (for assisting inputting a search query) are both based on language models (or indexes) that can rank web pages and queries according to a popularity criteria and/or a predetermined measure. In general, a non-local version of such applications will interact with one generic language model, and search or word-wheeling will therefore supply the same answer to the same input regardless of location—(e.g., a same result is obtained whether a user initiates a same query from Seattle versus New York.) The language model component can typically employ any language model (e.g., a probability distribution defined on sequences of words.) For instance, a trigram language model can be utilized. Additionally, restricted language models can be employed. Pursuant to an example, a language model utilized for web queries can be based on a list of queries and probabilities associated therewith. According to another example, a language model built upon syllabic elements can be employed in connection with expanding the implicit and/or explicit wildcard(s).

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation provides for classification of sentences from a language based on demographics (e.g. query logs in form of a tree structure and a smoothing thereof based on time, space, other user demographics, and the like) to enable local word wheeling and local web search associated with the predetermined demographic criteria—via employing: a classification encoder component (which forms the classification—e.g. tree structure—of sentences according to demographics); a local language models encoder component (which produces an associated encoding of local language models), and a decoder component that based on the classification structure and the local language models efficiently finds demographic relevant matches for input data given by the user (e.g., a part of a search query). A sentence can have different probabilities in language models associated with different demographics (e.g., space, time, and the like). Hence, a k-best expansion for input data by users in one locality can be different from a k-best expansion for the same input by other users in another locality. Such can provide for an efficient query or search to be performed based on demographic criteria, while effectively using system resources.

The encoder component leverages information stored in a log of sentences (e.g., a query log) via selectively obtaining, or mining sentences (e.g., queries from the log—based on criteria such as location of user, time, other demographic information, and the like) and summarizes such data based on a classification format (e.g., in from of tree structure with root nodes and leaves, wherein a node or leaf can represent queries issued from a region that is identifiable by longitudes and latitudes that define the region such as in from of a rectangle.) Such classification can subsequently be smoothed via moving sentences to different levels associated with the classification, wherein sentences of interest to a substantially large number of users move to higher levels, than sentences with interest to users with specific demographics, which are moved to lower levels of the classification (e.g., moving up queries of interest to a substantially larger number of users—such as a continent or a country—up the tree structure; while queries of interest to a substantially smaller number of users—such as, a city, neighborhoods in a city—move to lower portions of the tree.)

According to one particular aspect, the classification tree structure can be in form of a Kd-tree with an enhanced smoothing in accordance with a significance criterion. The decoder component can then employ such tree structure in a word wheeling and/or search to produce results that are of interest locally, nationally, or internationally, for example. Hence, each node can have a language model tailored thereto based on locality, to provide k-best expansions for explicit/ implicit wild cards inputted by the user.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
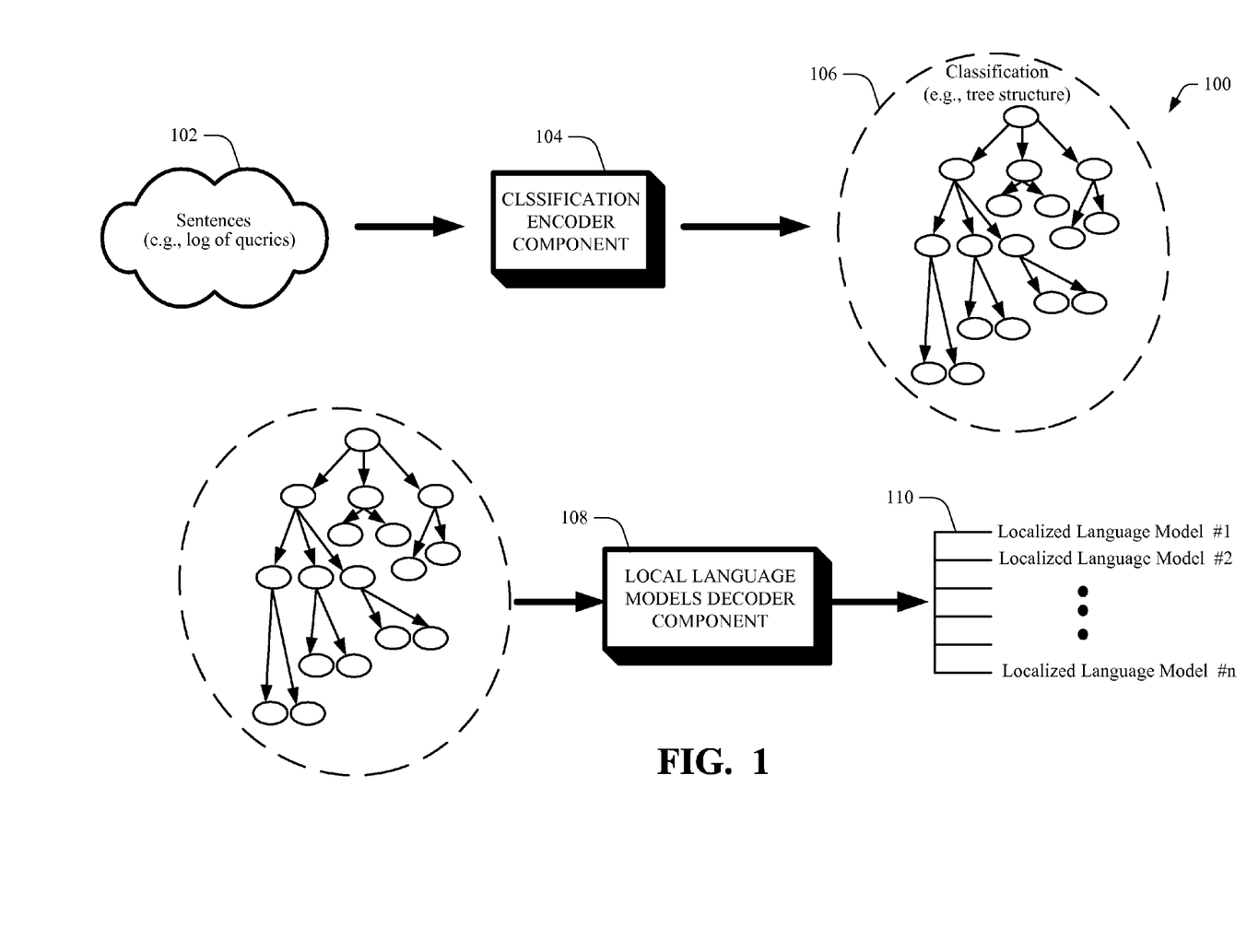
FIG. 1 illustrates a block diagram of an exemplary system that encodes queries from sentences (e.g., query logs) into a classification tree structure and further encodes such classification of sentences into local language models associated with nodes in the tree structure.

FIG. 1 illustrates a system 100 that creates a classification of sentences in a language, and further constructs associated local versions of language models, based on geographical location and/or other demographic criteria, where such local language models can be of different levels of granularity according to the chosen demographic criteria. In general, a language is a set of sentences (also known as strings) that are generated by a grammar. Such grammar can exist as: a finite state grammar; a context free grammar; or merely a list (such as a list of queries from a query log). In addition, a language model associates probabilities with each of the sentences in the language. The system 100 provides local versions of language models 110 (1 thru n, n being an integer). Such local version of a language model (localized language model 110) is a language model wherein probabilities of sentences depend on demographics (e.g., time, space, other user demographics, and the like). As illustrated in FIG. 1, the construction of local language models of varying demographic granularity is facilitated via an encoding in the form of the classification 106 (e.g. tree structure) that is created from sentences 102 (e.g., a query log) by the classification encoder component 104, and via a local language models encoder 108, which uses the classification of sentences 106 in order to construct the localized language models.

By employing the encoded classification structure and associated local language models, a decoder component (not shown) can subsequently enable local word wheeling and/or local web search—via blending answers from local language models of varying demographic granularity, as described in detail infra. Such decoder component can blend specific language models according to the classification structure and the demographics of the user utilizing the system in order to enable the localized word wheeling and/or web search. For example, a search query for a "Zoo" initiated by a user located in Seattle, can retrieve answers such as Seattle zoo (in addition to other results that are in localities farther away from Seattle)—as compared to a conventional search system that employs non-localized language models, wherein such conventional search is likely to return the most popular zoo in the US and/or in the world (and typically not a zoo that is located in Seattle.) Accordingly, the subject innovation enables a k-best expansion for input data by users in one locality, to be different from a k-best expansion for the same input by other users in another locality. Such can provide for an efficient query or search to be performed, while effectively using system resources. The encoder component 104 leverages information stored in sentences 102 (e.g. a query log) via selectively obtaining, or mining queries from such sentences 102, (e.g., based on criteria such as location of user, time, other demographic information, and the like) and summarizes such data in from of a classification 106 (e.g., tree structure). As illustrated in FIG. 1, the exemplary tree structure (which illustrates a particular classification) can allow for arbitrary fan outs and/or non binary branching and depths. It is to be appreciated that other classification structures (besides a tree structure) can also be employed and are well within the realm of the subject innovation.

Figure 2:
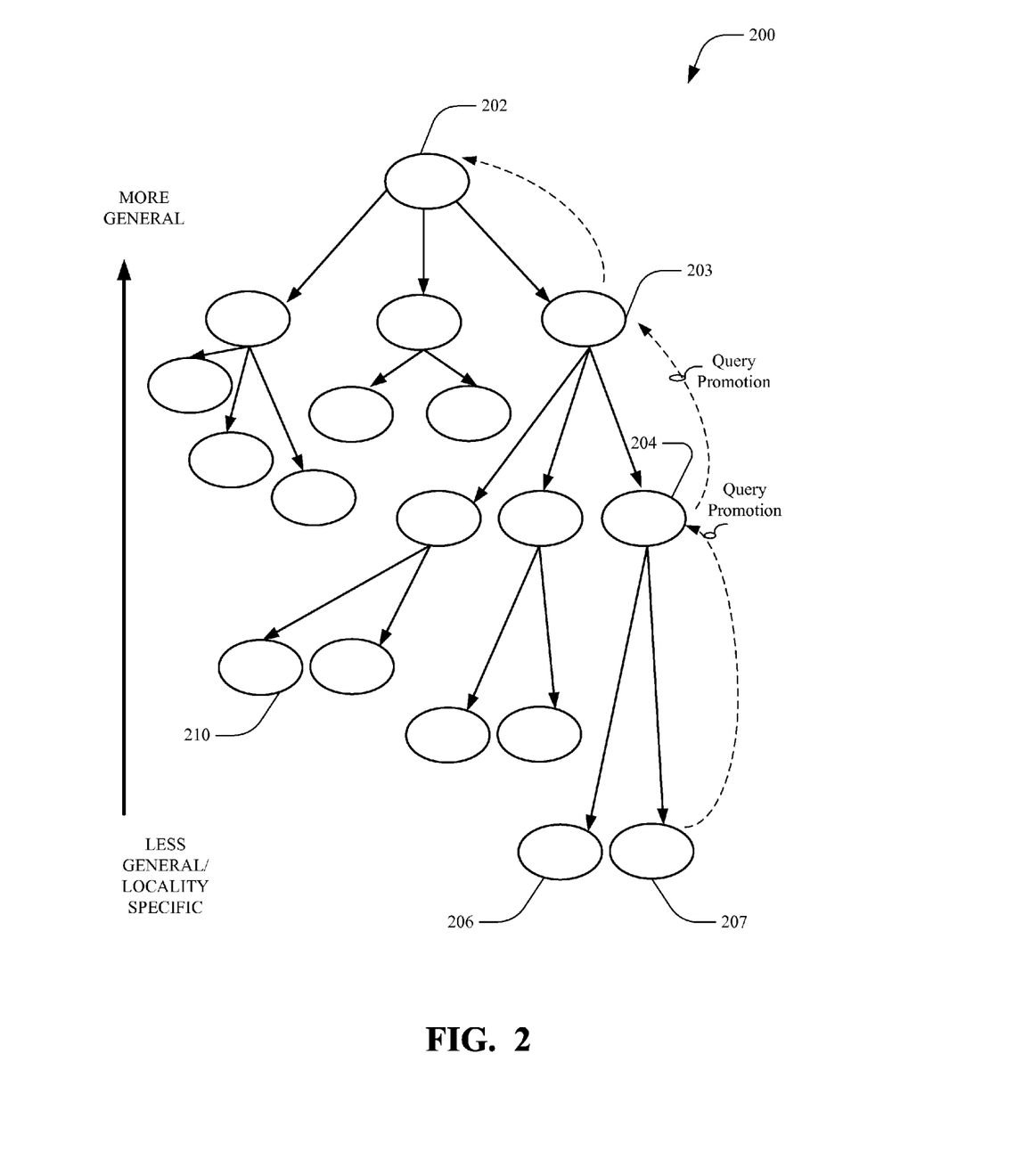
FIG. 2 illustrates a tree structure that is smoothed in accordance with an aspect of the subject innovation.

FIG. 2 illustrates a particular aspect of classification in form of a tree structure 200 in accordance with a particular aspect of the subject innovation. Any node in the structure can represent queries issued from a region that is identifiable by longitude(s) and latitude(s) that define the region (e.g., in from of a rectangle.) The further down in the tree 200 a node appears, the more specific a region it covers. The tree structure 200 can subsequently be smoothed via moving queries in between nodes (e.g., from the node 207 to its parent node 204, then from 204 to 203, and from 203 to 202) based on a significance criteria, wherein the most general queries/elements move towards the root of the tree 200 (e.g. queries of interest to a substantially large demographic group of users; such as a continent or a country, and the like), while queries of interest to a substantially smaller demographic group of users (e.g., a city, neighborhoods in a city, and the like) reside at lower portions of the tree.

The tree structure 200 can be in form of a Kd-tree with an enhanced smoothing in accordance with significance criteria, as described in detail infra. The tree structure of queries can be employed by the local language models component to construct language models based on locality. Hence, each node can have a language model tailored thereto based on locality. The decoder component can therefore employ such tree structure with associated local language models in a word wheeling to produce or blend results that are of interest locally, nationally, or internationally, for example. Results can be in the form of k-best expansions for a text string with explicit/implicit wildcards inputted by the user.

According to one particular aspect of the subject innovation, a list of elements can be provided, wherein each element can contain: frequency, query, latitude, longitude, and other demographics. A location tree can be in the form of a binary tree that partitions the World (or a predetermined area to be covered) into tiles. The subject innovation can alternate between splitting on latitude and longitude at different levels in the tree. A split can be created so that the sum of frequencies for elements remains the same on both sides of the split. Accordingly, the elements can be partitioned into the leaves in the tree, according to the elements latitude and longitude, for such elements.

For example, leaf 210 can correspond to the Seattle area and leaf 207 could be the Miami area. Leaf 210 can then contain all queries and their frequencies relevant to such location. Theoretically, a language model can be built at each location, and then the proper language model can then be selected, to utilize according to location of user that inputs the text. Such approach can be enhanced by creating an adjusted location tree, wherein distributed elements on the leaves are thinned out, by (recursively) promoting elements that are similar upwards in the tree. If frequencies for the same query in two siblings (e.g., 206, 207) are similar—but not necessarily equal—the two elements will both be promoted to their respective parent in the location tree. Accordingly, for such case promotion is performed by deleting elements in the siblings (the same as setting frequencies to zero), and then instead inserting the element in the parent (yet with a frequency equal to the sum of the actual frequencies in the siblings.) Otherwise, if the frequencies are not similar, the sibling with smallest frequency can be promoted by inserting the element in the parent with a frequency equal to two times the smallest of the two frequencies and then subtracting such frequency from both siblings (leaving the smallest frequency sibling with a zero value—and in effect deleting the element from such sibling). It is to be appreciated that in general, any reasonable test for similarity of frequencies can be employed when deciding on the promotion of siblings—and such choice can in part depend on the application, for example.

Moreover, a "sign test" can be implemented, which returns the (one-sided) level of significance assigned to the alternative hypothesis that the smaller frequency is smaller than the higher frequency under such hypothesis that they are equally likely, for example. Such hypothesis (H0) can therefore state a Binomial distribution with p=0.5, and the significance level equals the (one-sided) Binomial tail, which can be computed for smaller frequencies (e.g., <=50). For higher frequencies, the binominal distribution can be efficiently approximated by a Normal distribution. Accordingly, the significance level can decide the degree of promotion of elements from more local nodes (e.g., 206, 207) toward more global nodes (e.g., 204) (from leafs towards the root). With a smaller significance level it is harder to violate the H0 hypothesis that two frequencies are similar, and elements are in this case more likely to move upwards in the location tree. A single significance level can be employed for typically all tests in the location tree. Alternatively, the significance level can be adjusted in a Bonferroni-like style by employing the significance level adjustment, wherein:

$$\alpha(D) = 1 - 0.95^{\left(\frac{1}{2^{(D-1)}}\right)}$$

where $\alpha$ is the chosen significance level and D is the depth in the tree, e.g.:

$\alpha(1)=0.05$
$\alpha(2)=0.0253$
$\alpha(15)=3.13e-6$

Given the re-distribution of elements according to the above promotion scheme, a language model can be created for each node in the location tree. For a small significance level, the language models at the many leaf nodes in the structure can typically be substantially small and contain only truly local information. As one moves up in the tree, the language models covers larger areas and the root will contain information that is equally likely regardless of the location. For instance, the query "pizza" will likely appear at the root, whereas "Joe's pizza joint" that is specific to a locality will appear in the leaf corresponding to the location of this very specific pizza place.

The location tree 200 can have a localized language model at each node in the tree. Each of such localized language models can be of the same type; as the type employed for the generic/non-local WildThing (or Search)—yet the individual models are typically substantially smaller. Accordingly, a decoder can employ the location tree of language models to retrieve the k best matches to a text input. For example, given a particular location, the subject innovation can find the k best matches and their frequencies in every node on the path from the leaf node of the tree (associated with that particular demographic location) to the root node of the tree. The same method as for the generic WildThing (or Search), of patents serial number Ser. No. 11/332,954, and Ser. No. 11/333,846, filed on Jan. 17, 2006, incorporated by reference herein, can be employed to find matches in a model at a particular node. Some of the k best matches can be the same across different nodes, while others may not. For matches that appear among the k best matches in one node and not another, such matches and their associated frequencies have to be looked up specifically in the nodes where they do not appear among the k best matches. For all unique matches, in this set of matches the frequencies for a match in each node can now be added, with a discount for the frequencies obtained at intermediate nodes in the localization tree in order to reflect the average contribution on the specific location. Such discounted frequency can be computed as Frequency<−frequency/(2^L), where L is the length of the path from the intermediate node to the leaf.

As explained earlier, the subject innovation is not limited to geographical location, and other criteria such as time, time and space, and other demographic criteria can also be employed. Hence the most general queries can move to top of the tree, such as moving up queries of interest to a substantially large demographic group of users (e.g. of interest to a continent or a country, and the like) up the tree structure; while queries of interest to a substantially smaller demographic group of users such as, a city, neighborhoods in a city, and the like—move to lower portions of the tree.

Figure 3:
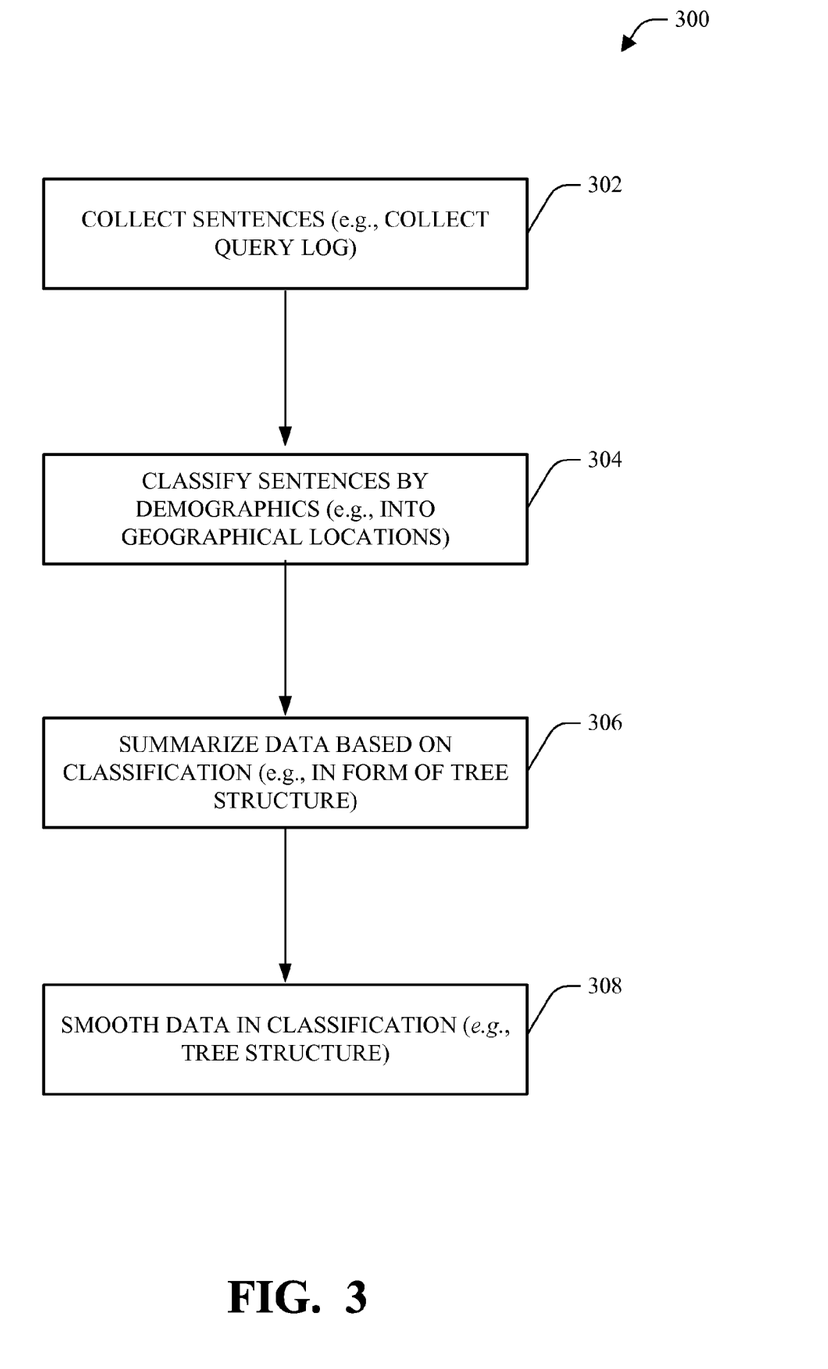
FIG. 3 illustrates a particular methodology of encoding to obtain a tree structure in accordance with an aspect of the subject innovation.

FIG. 3 illustrates a related methodology 300 in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the subject innovation. In addition, not all illustrated blocks, events or acts, any be required to implement a methodology in accordance with the subject innovation. Moreover, it will be appreciated that the exemplary method and other methods according to the innovation can be implemented in association with the method illustrated and described herein, as well as in association with other systems and apparatus not illustrated or described. Initially, and at 302 sentences can be collected from a language (e.g., queries gathered from query logs), wherein such sentences are subsequently classified based on demographics at 304 (e.g., distributed among nodes to form a tree structure, based on geographic location that such queries were issued from.) It is to be appreciated that distribution of queries based on geographic location represents an exemplary criteria, and other demographic criteria can also be employed for such distribution among nodes and tree formation. At 306, the data from sentences can be summarized based on such classification (e.g., query logs are summarized in form of a tree structure.) Subsequently and at 308, such classification (e.g., tree structure) can then be smoothed by moving sentences among different levels (e.g. moving query from nodes at lower portions of the tree to upper portions) based on significance criteria.

Figure 4:
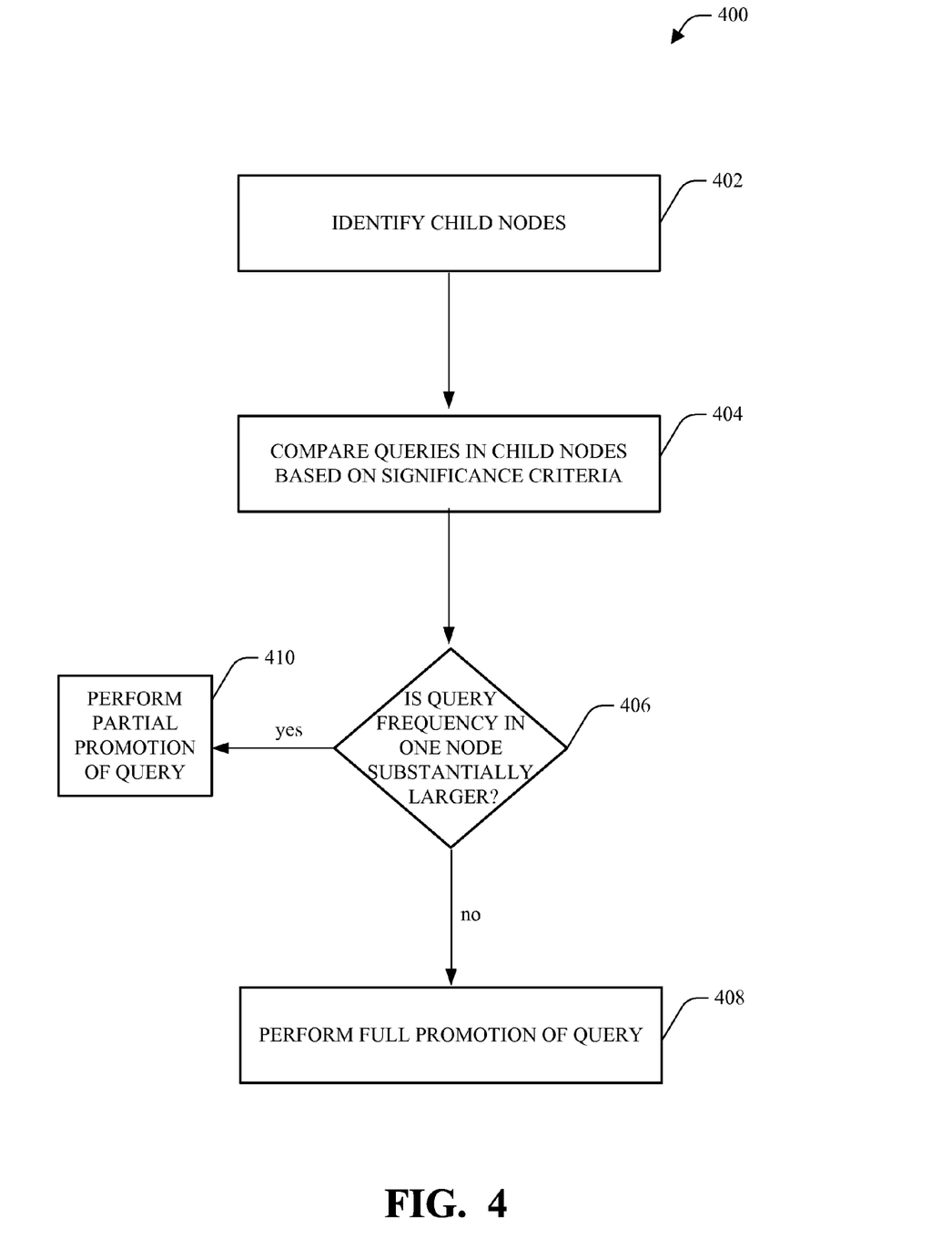
FIG. 4 illustrates a further methodology of decoding the tree structure in accordance with an aspect of the subject innovation.

FIG. 4 illustrates a particular methodology 400 of smoothing for a particular classification in form of a tree in accordance with an aspect of the subject innovation. Initially and at 402, child nodes can be identified. Subsequently and at 404, child nodes that share a parent node are compared based on predetermined criteria (e.g., significance test criteria), to verify whether some of the queries in such nodes should be promoted up the tree. At 406 a determination is made whether a query frequency in one node is substantially larger than in a sibling child node. If the counts for a query are significantly larger in one of two child nodes, (as computed based on predetermined criteria) then at 410, the counts for such query can be partially promoted—such as promoting, from both siblings, a lowest count for the query in the siblings. For example, if the left-most sibling obtain a count of 3 for a particular query and the right-most sibling has count 13 for the same query, then the count of 3 moves from each of such siblings up to the parent, hence leaving a count 6 in the parent node associated with the siblings. Such partial promotion results in right-most sibling to subsequently include 10 counts, and the left-most sibling to have a count of 0. Alternatively, if comparison of a query in the child nodes indicate a relatively equal count, (or a difference below a predetermined threshold), the counts for this query are promoted from both children to the parent node. Hence, significance criteria for moving the nodes upwards can resemble popularity criteria among users, for example. In general, the top most root node will cover queries that are popular to all users—(e.g., regardless of user demographics.) It is to be appreciated that any reasonable test for similarity of frequencies (e.g., depending on the application) can be employed when determining on the promotion of siblings.

In a related aspect artificial intelligence (AI) components can be employed to facilitate creating the smoothed tree from query logs. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 5:
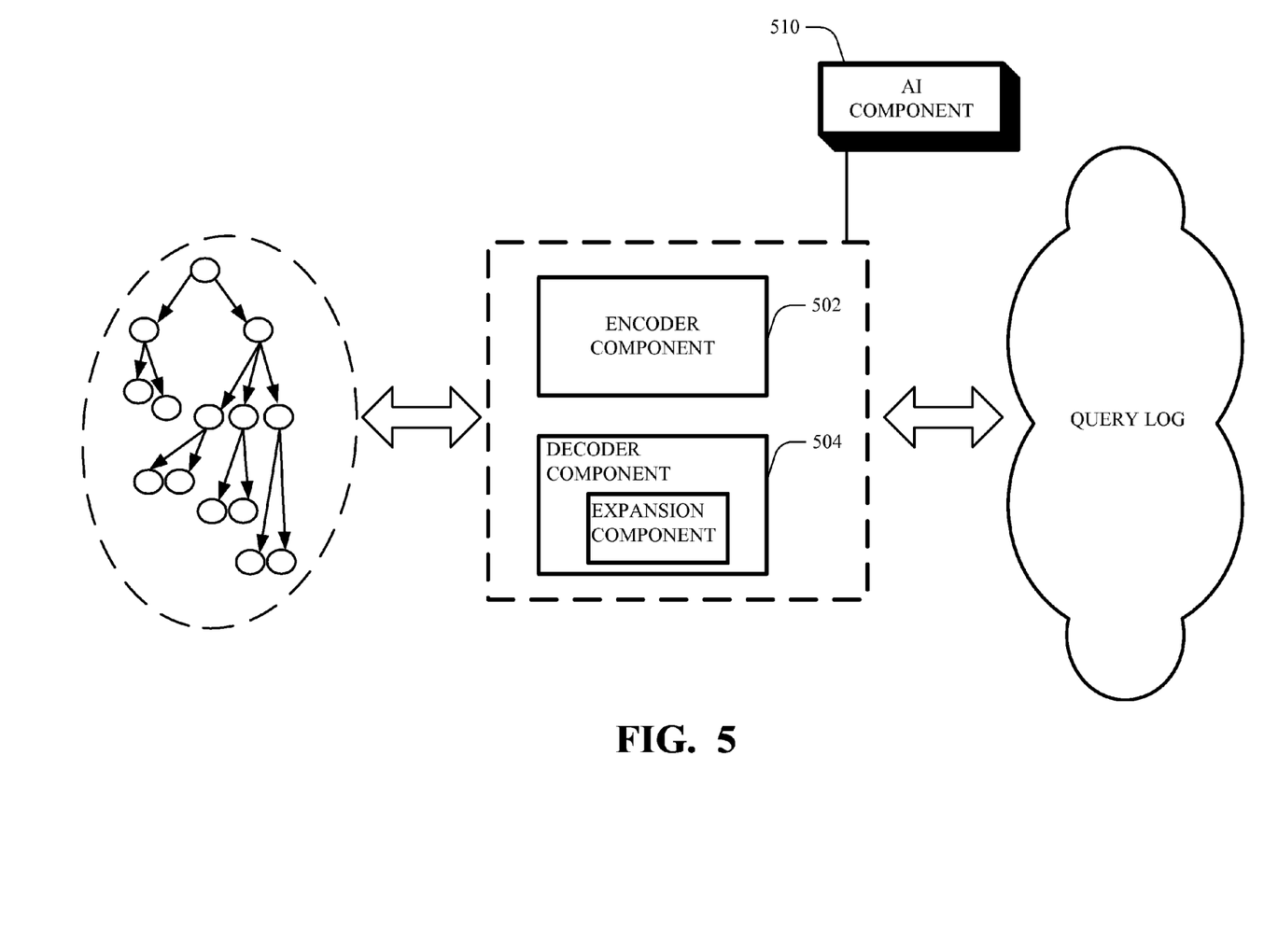
FIG. 5 illustrates an exemplary encoder/decoder system that can employ an artificial intelligence component to facilitate smoothing of the tree structure.

FIG. 5 illustrates an artificial intelligence component 510 that can interact with the encoder component 502 (which facilitates displacing sentences according to their locality in a classification structure of nodes and constructing associated local language models), and a decoder component 504 (which facilitates expansion of input—as described in detail infra— by the user in accordance with the constructed encoding). For example, a process for determining when to promote a sentence up the classification (e.g., tree structure) can be facilitated via an automatic classifier system and process. A classifier is a function that maps an input attribute vector, $x=(x1, x2, x3, x4, xn)$, to a confidence that the input belongs to a class, that is, $f(x)$=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed, and at what time of day to implement tighter criteria controls.

Figure 6:
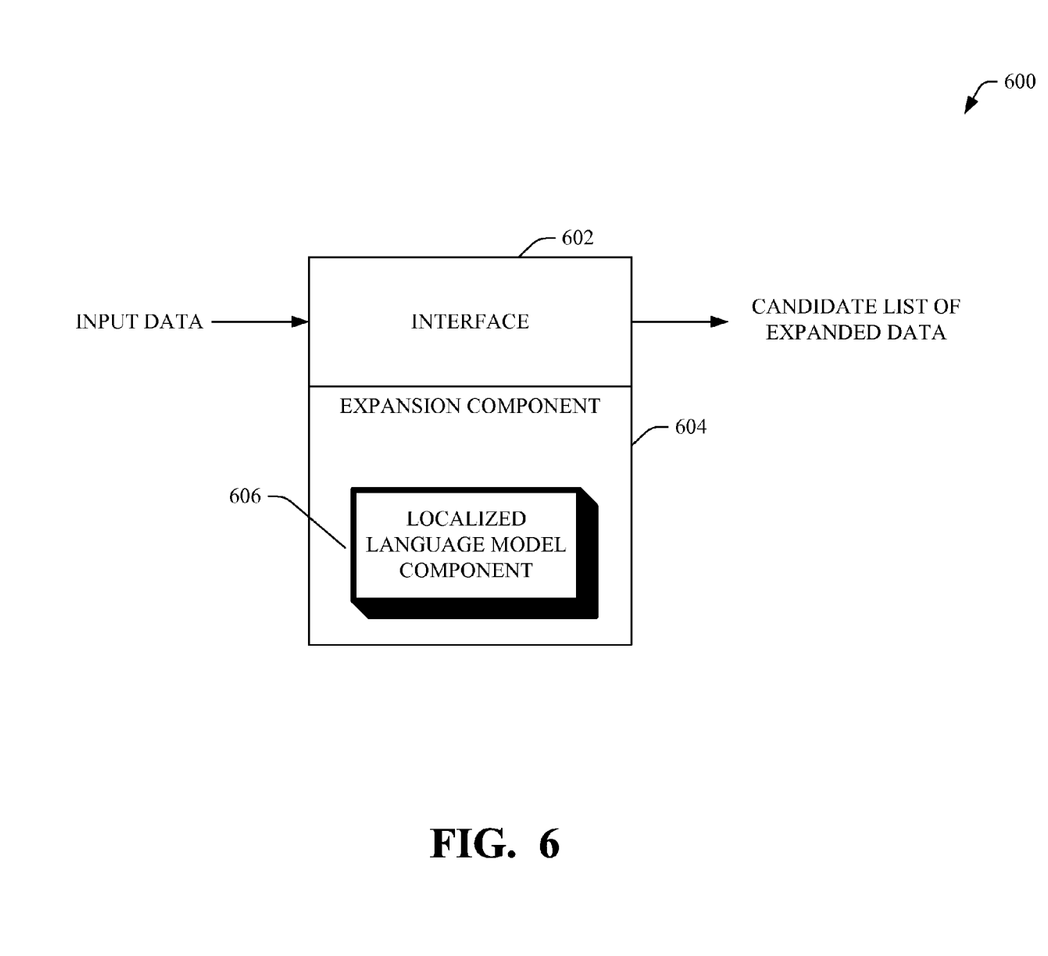
FIG. 6 illustrates a system that expands input data, based on a localized language model component.

FIG. 6 illustrates a system 600 that expands input data, based on a localized language model component 606. The localized language model component 606 can typically blend generic answers with local answers, which are of substantially great interest to local users. Such localized language model component 606 includes a spectra of language models wherein probabilities of sentences depend on demographics (e.g., time, space, other user demographics, and the like). In general, the language models in the local language model component can all comply with the given demographics, and yet can vary in their demographic locality/generality, to allow for blending of answers with varying degree of locality. For example, for a classification in the form of a tree structure, the local language component can typically involve all the localized language models associated with nodes on the path from a leaf in the tree (the specific demographic location) to the root of the tree (the generic demographic location shared by all).

The system 600 can include an interface 602 that obtains input data and an expansion component 604 that generates a candidate list of expanded data utilizing the input data. The interface 602 can receive the input data from any type of input device (not shown). For instance, the input data can be generated by a personal computer, a laptop, a handheld, a cellular telephone, a server, and the like. It is to be appreciated that the interface 602 and/or the expansion component 604 can be coupled to the input device, can be wholly or partially comprised within the input device, and/or can be stand alone components.

In general, any type of input data can be received by the interface 602. For example, when a user employs a personal computer, the interface 602 can obtain alphanumeric characters associated with keys depressed by the user. Additionally, voice recognition can be employed to analyze a user's spoken input and/or handwriting recognition can be utilized to identify written data; thus, the interface 602 can receive audile and/or visual data. By way of further illustration, the interface 602 can receive numeric characters associated with a cellular telephone keypad, where each of the numeric characters can be related to a number of alphanumeric characters.

The input data can include one or more explicit wildcards. The wildcard(s) can be represented by a "*"; however, any disparate representation of the wildcards falls within the scope of the subject innovation (e.g., any other character can be utilized as the wildcard instead of *, a sound, a mark, . . . ). The explicit wildcards can be included anywhere within the input data. Thus, for example, the input "Linc*n" can be typed with a keyboard associated with a personal computer and can be provided to the interface 602 if a user desires to enter the word "Lincoln". According to another illustration, a user can vocalize "m-star-t" and this input data can be provided to the expansion component 604, which can further employ voice recognition to identify the input data as "m*t", for example.

After obtaining the input data, the interface 602 can provide the input data to the expansion component 604. As explained earlier, the expansion component 604 can include a localized language model component 606 that enables employment of localized language models that provides likely expansions of wildcards associated with the input data, based on demographics. Thus, by employing the localized language models and their classification structure, the expansion component 604 can expand the explicit wildcards associated with the input data to generate a candidate list of expanded data. Moreover, the expansion component 604 can insert implicit wildcards into the input data, wherein such implicit wildcards can similarly be expanded. The localized language models and their classification structure—as part of the localized language model component 606—can be employed to find the k-best expansions, wherein the k-best expansion for input data by users in one locality can be different from a k-best expansion for the same input by other users in another locality. Moreover, the localized language models employed by the localized language model component 606 can be frequently updated to enable timely identification of breaking news stories.

Although the interface 602 is depicted as being separate from the expansion component 604, it is contemplated that the expansion component 604 can include the interface 602 or a portion thereof. Also, the interface 602 can provide various adapters, connectors, channels, communication paths, and the like to enable interaction with the expansion component 604.

Figure 7:
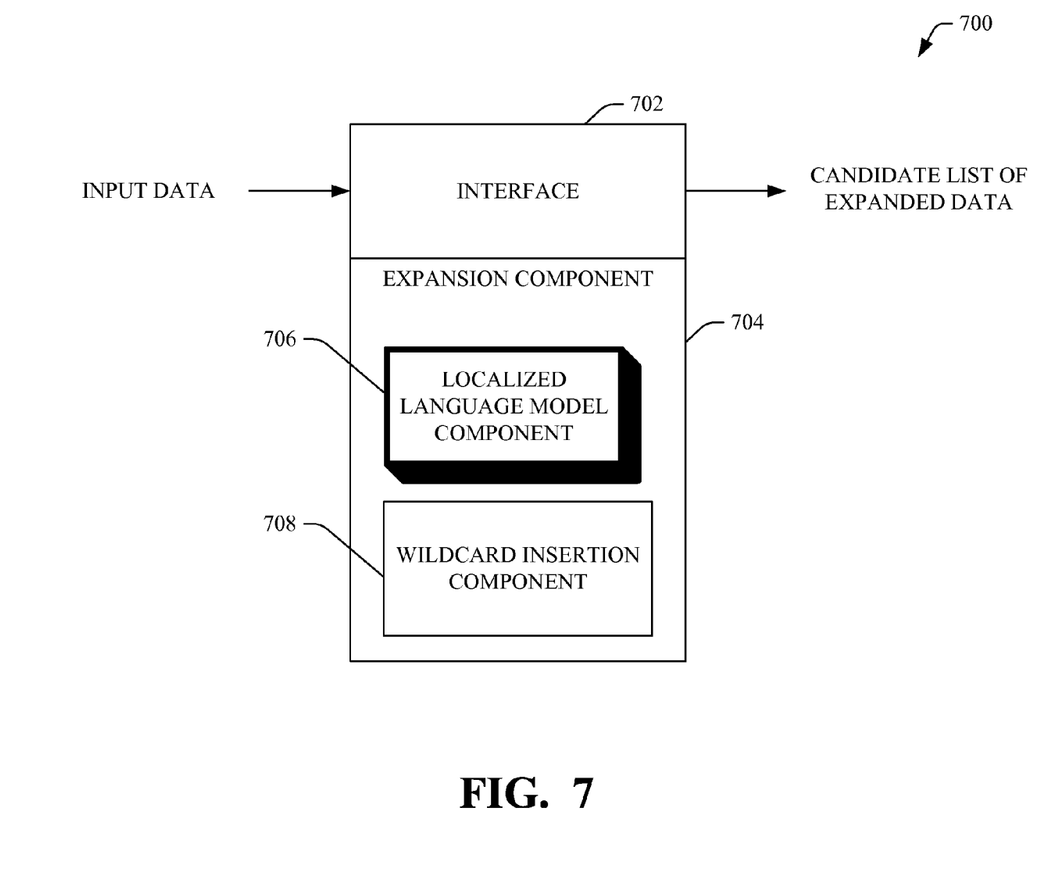
FIG. 7 illustrates a system that inserts implicit wildcards into input data based on a localized language in accordance with an aspect of the subject innovation.

The expansion component 604 yields a local interest of candidate list of expanded data, which can thereafter be utilized. For instance, the local interest of candidate list can be displayed to the user (e.g., via the interface 602) and/or the user can make a selection from such local interests. The selected expansion from the candidate list can be utilized in connection with performing a search, can be entered into a document or message being composed, can be inserted in an address bar, etc. It is contemplated that the interface 602 can provide the candidate list of expanded data (e.g., to a user, to an input device, . . . ) as shown. The expansion component 604 or a disparate component (not shown) can output the candidate list. For instance, the localized candidate list can include the k-best expansions FIG. 7 illustrates a system 700 that inserts implicit wildcards into input data. The system 700 includes an interface 702 that receives input data and provides the input data to an expansion component 704. The expansion component 704 can expand the input data to yield a local candidate list of expanded data. For instance, the k-best expansions can be generated with the expansion component 704. The expansion can be effectuated, at least in part, utilizing language models and their classification structure provided by a localized language model component 706.

The expansion component 704 can additionally comprise a wildcard insertion component 708 that can insert one or more implicit wildcards into the input data. It is to be appreciated that the wildcard insertion component 708 can position implicit wildcards anywhere in the input data. Subsequent to the insertion of the implicit wildcards, the implicit wildcards as well as any explicit wildcards in the input data can be expanded based on the localized language models.

In a related aspect, the wildcard insertion component 708 can identify an end of an intended word within the input data. For example, the wildcard insertion component 708 can insert a wildcard at this identified location. It is to be appreciated that a number of such locations can be determined and therefore any suitable number of implicit wildcards can be included with the input data. The wildcard insertion component 708 can locate the ends of intended words by identifying spaces as well as the end of input data and insert an implicit wildcard before each of these locations within the input data.

The wildcard insertion component 708 and/or the expansion component 704 can enable word wheeling. For example, users can input data on a mobile device such as a cellular telephone or a PDA with limited keyboard capabilities, which can be associated with inefficient and/or time-consuming input of alphanumeric characters. Additionally, word wheeling can compensate for a user not knowing a correct spelling of an intended input. Further, word wheeling can assist a user that only has a vague idea of queries to input (e.g. in a web search context) or that is curious about what is currently popular and accordingly match a partial input.

Figure 8:
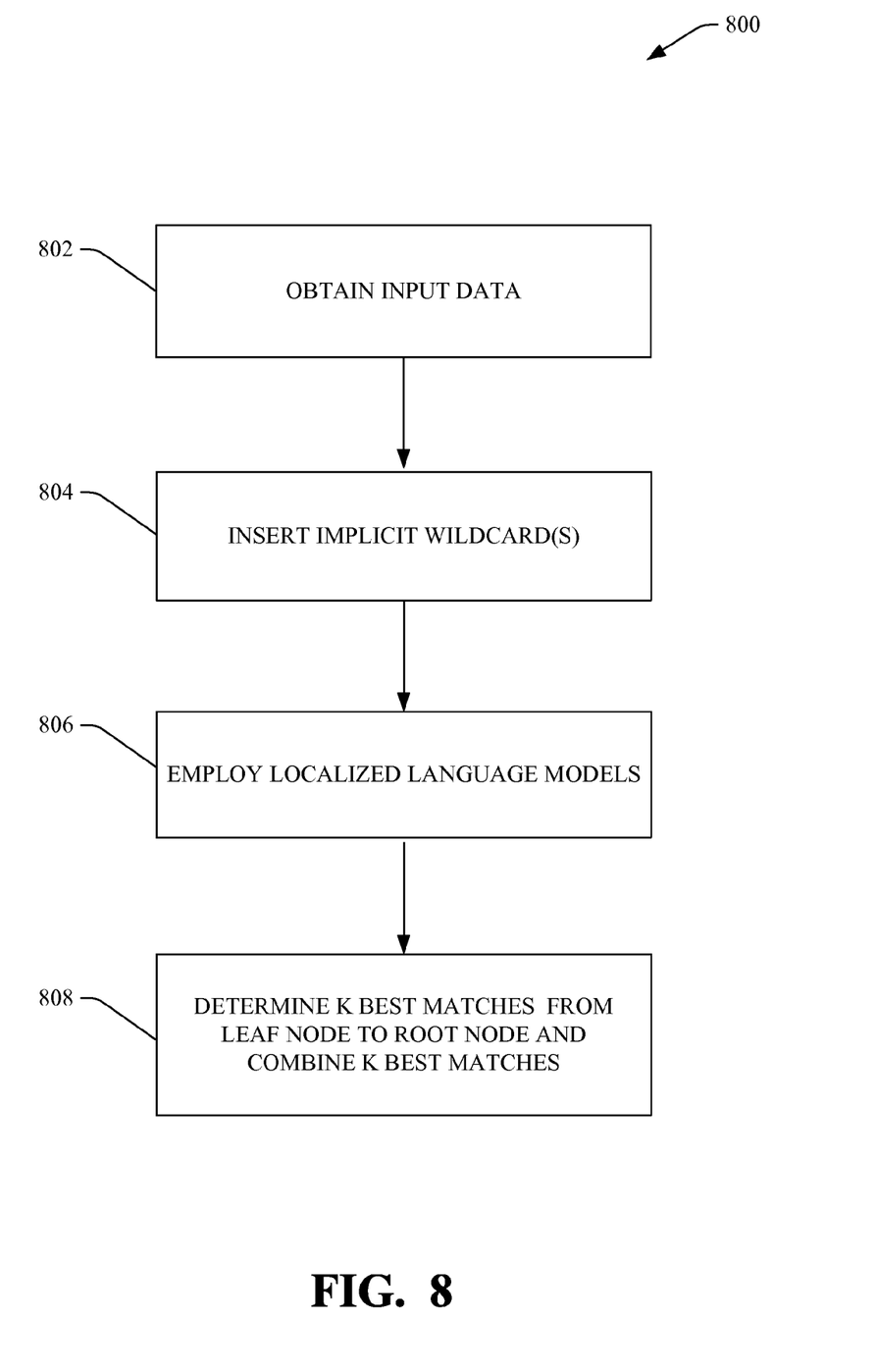
FIG. 8 illustrates a methodology that facilitates expanding input data based on local interests.

FIG. 8 illustrates a methodology 800 that facilitates expanding input data based on local interests. Initially, and at 802, input data can be obtained, wherein such input data can be received for any type of input device (e.g., a desktop computer, a laptop, a handheld, a cellular telephone, a server, . . . ), for example. Additionally, the input data can be related to a search query, a text message (e.g. short message service (SMS) message), an instant message, a document being generated and/or edited, and the like. Moreover, such input data can include alphabetic characters, numerical characters, handwriting data, spoken data, a combination thereof, for example. At 804, one or more implicit wildcards can be inserted into the input data. For instance, the implicit wildcards can be inserted at an end of the input data. Moreover, the implicit wildcards can be inserted at an end of one or more intended words within the input data. For example, an implicit wildcard can be inserted before each space in the input data. At 806, localized language models and their classification structure can be employed. The probabilities of sentences in a localized language model depend on demographics (e.g., time, space, other user demographics, and the like). Hence, a k-best expansion for input data by users in one locality can be different from a k-best expansion for the same input by other users in another locality. Subsequently, the k-best expansions of wildcards associated with the input data can be generated, which can relate to local interests. For example, given a particular location, the subject innovation can determine the k best matches and their frequencies in every node on the path from the leaf node of the tree (associated with that particular demographic location) to the root node of the tree, followed by a combination thereof at 808.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation may be implemented as a system, method, apparatus, or article of manufacture using standard programming and/or engineering techniques to produce software, firmware, hardware or any combination thereof to control a computer to implement the disclosed innovation. As used in this application, the term "component" is intended to refer to a computer-related entity, either hardware, a combination of hardware and software, software, or software in execution. For example, computer readable media can include but are not limited to magnetic storage devices (e.g., hard disk, floppy disk, magnetic strips . . . ), optical disks (e.g. compact disk (CD), digital versatile disk (DVD). . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
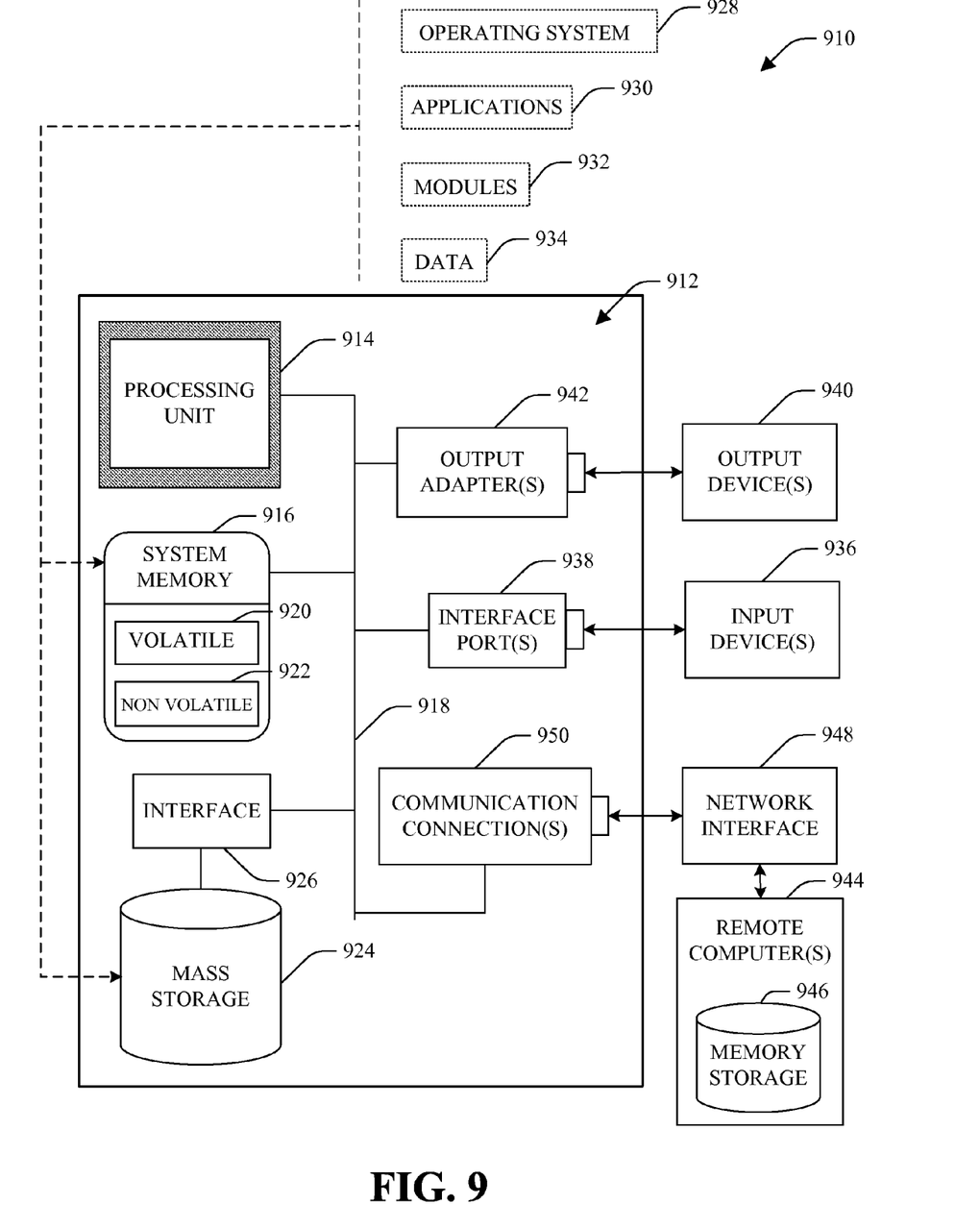
FIG. 9 illustrates an exemplary operating environment that can be employed in accordance with the claimed subject matter.
Figure 10:
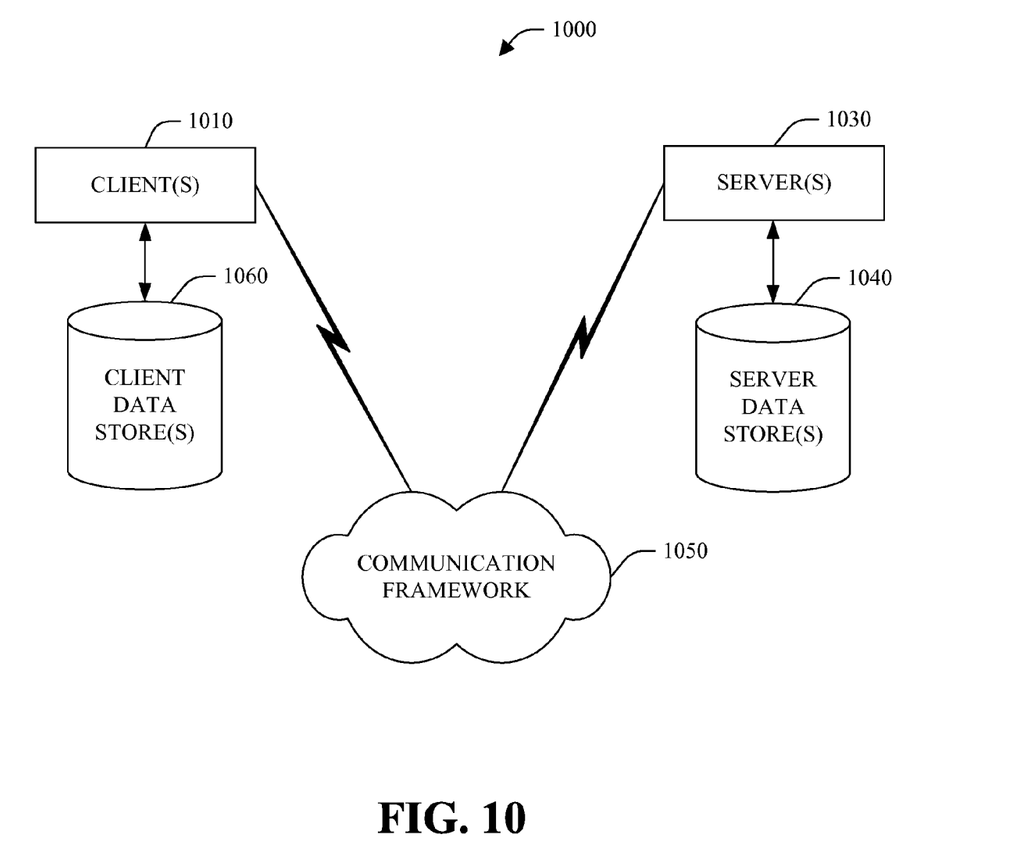
FIG. 10 illustrates an exemplary networking environment, wherein various novel aspects of the claimed subject matter can be employed.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, handheld computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 9, an exemplary environment 910 for implementing various aspects disclosed herein includes a computer 912 (e.g., desktop, laptop, server, hand held, programmable consumer or industrial electronics . . . ). The computer 912 includes a processing unit 914, a system memory 916, and a system bus 918. The system bus 918 couples system components including, but not limited to, the system memory 916 to the processing unit 914. The processing unit 914 can be any of various available microprocessors. Dual microprocessors and other multiprocessor architectures (e.g. multi-core) also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory.

Computer 912 also includes removable/non-removable, volatile/non-volatile computer storage media. FIG. 9 illustrates, for example, mass or auxiliary storage 924. Mass storage 924 includes, but is not limited to, devices like a magnetic disk drive, floppy disk drive, tape drive, Jaz drive, Zip drive, LS-100 drive, flash memory card, or memory stick. In addition, mass storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the mass storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on mass storage 924 and loaded to system memory 916, acts to control and allocate resources of the system 912. System applications 930 take advantage of the management of resources by operating system 928 through program modules 932 and program data 934 stored either in system memory 916 or on mass storage 924. It is to be appreciated that the subject innovation can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912 and to output information from computer 912 to an output device 940. Output adapter 942 is provided to illustrate that there are some output devices 940 like displays (e.g., flat panel, CRT, LCD, plasma . . . ), speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected (e.g., wired or wirelessly) via communication connection 950. Network interface 948 encompasses communication networks such as local-area networks (LAN) and wide-area networks (WAN).

Communication connection(s) 950 refers to the hardware/software employed to connect the network interface 948 to the bus 918. While communication connection 950 is shown for illustrative clarity inside computer 916, it can also be external to computer 912. The hardware/software necessary for connection to the network interface 948 includes, for exemplary purposes only, internal and external technologies such as, modems including regular telephone grade modems, cable modems, power modems and DSL modems, ISDN adapters, and Ethernet cards or components.

FIG. 10 is a schematic block diagram of a sample-computing environment 1000 with which the subject innovation can interact. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing the subject innovation, for example. One possible communication between a client 1010 and a server 1030 may be in the form of a data packet transmitted between two or more computer processes.

The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030. By way of example and not limitation, the anonymization systems as described supra and variations thereon can be provided as a web service with respect to at least one server 1030. This web service server can also be communicatively coupled with a plurality of other servers 1030, as well as associated data stores 1040, such that it can function as a proxy for the client 1010.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A computer implemented system comprising the following computer executable components:
   multiprocessors;
   a classification encoder component that summarizes a query log into a classification based on demographics, wherein the classification is in the form of a tree structure to summarize the query log, wherein the classification encoder component leverages information stored in the query log by selectively mining a plurality of queries from the query log and summarizing the plurality of queries in the tree structure;
   a local language models encoder component that expands the classification to form localized language models, to facilitate a search for local interests; and
   an artificial intelligence component that facilitates smoothing of the classification, wherein the artificial intelligence component comprises a support vector machine (SVM) configured via a learning phase within a classifier constructor and a feature selection module, wherein the classifier constructor is used to learn and perform a determination according to a predetermined criteria to update a previously inferred schema, modify the criteria on a referring algorithm based at least in part upon the kind of data being processed and select the time of day to implement the modifying of the criteria.

2. The computer implemented system of claim 1, further comprising a decoder component with an expansion component that evaluates input data via classification of local language models to produce a set of expansions.

3. The computer implemented system of claim 1, wherein the tree structure with nodes promotes queries based on predetermined criteria.

4. The computer implemented system of claim 3, wherein the predetermined criteria are significance test criteria.

5. The computer implemented system of claim 1, further comprising a local context component that provides information about a user's locality in order to produce expansions relevant to local interests.

6. The computer implemented system of claim 1, wherein the demographics are based on at least one of time and space.

7. The computer implemented system of claim 1, wherein the tree structure is in the form of a Kd-tree structure.

8. The computer implemented system of claim 1 further comprising an interface component that accepts input data from a user.

9. A computer implemented method comprising the following computer executable acts:
  summarizing, by a processor, query logs in the form of a tree structure based at least in part on demographics, the summarizing comprising:
    leveraging information stored in a query log by selectively mining a plurality of queries from the query log; and
    summarizing the plurality of queries in the tree structure; forming localized language models from the classification; and smoothing the tree structure, the smoothing comprising:
      using an artificial intelligence component, the artificial intelligence component comprising:
      configuring a support vector machine (SVM) using a learning phase within a classifier constructor and a feature selection module, wherein the classifier constructor is used to automatically learn and perform a determination according to a predetermined criteria to update a previously inferred schema, modify the criteria on a referring algorithm based upon the kind of data being processed and select the time of day to implement the modifying of the criteria.

10. The computer implemented method of claim 9 wherein the smoothing further comprises moving the sentences among levels of the tree structure.

11. The computer implemented method of claim 10 further comprising expanding an input based on the localized language.

12. The computer implemented method of claim 9, the forming act comprising forming local language model(s) for the nodes.

13. The computer implemented method of claim 12 further comprising promoting nodes based on predetermined significance criteria.

14. The computer implemented method of claim 12 further comprising obtaining k best matches in every node on a path from a leaf node to a root node of the tree, and combining the k best matches.

15. The computer implemented method of claim 9, wherein the smoothing is based on predetermined criteria.

16. A computer implemented system comprising the following computer executable components:
  multiprocessors;
  means for forming a classification structure of local language models based on demographics, the forming comprising a classification encoder component, wherein the classification is in the form of a tree structure to summarize query logs, wherein the classification encoder component leverages information stored in a query log via selectively mining a plurality of queries from the query log and summarizing the plurality of queries in the tree structure;
  means for creating localized language models from the classification; and
  means for employing the classification structure of local language models to facilitate input expansions of local interest, the employing comprising an artificial intelligence component, wherein the artificial intelligence component comprises a support vector machine (SVM) configured via a learning phase within a classifier constructor and a feature selection module, wherein the classifier constructor is used to automatically learn and perform a determination according to a predetermined criteria to update a previously inferred schema, modify the criteria on a referring algorithm based upon the kind of data being processed and select the time of day to implement the modifying of the criteria.

* * * * *